US012770050B2

(12) United States Patent
Pudipeddi et al.

(10) Patent No.: US 12,770,050 B2
(45) Date of Patent: Oct. 20, 2026

(54) SHARED MEMORY SPACES IN DATA AND MODEL PARALLELISM

(71) Applicant: Microsoft Technology Licensing, LLC, Redmond, WA (US)

(72) Inventors: Bharadwaj Pudipeddi, San Jose, CA (US); Jinwen Xi, Sunnyvale, CA (US); Maral Mesmakhosroshahi, Sunnyvale, CA (US); Gurupurna Vasisht, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 989 days.

(21) Appl. No.: 17/063,329

(22) Filed: Oct. 5, 2020

(65) Prior Publication Data

US 2022/0108209 A1 Apr. 7, 2022

(51) Int. Cl.
*G06F 13/28* (2006.01)
*G06N 20/00* (2019.01)

(52) U.S. Cl.
CPC ............. *G06N 20/00* (2019.01); *G06F 13/28* (2013.01)

(58) Field of Classification Search
CPC ................................ G06N 20/00; G06F 13/28
See application file for complete search history.

(56) References Cited

U.S. PATENT DOCUMENTS

2010/0191822 A1* 7/2010 Archer ................ H04L 12/4641 709/213
2020/0293456 A1* 9/2020 Ramadoss ........... G06F 12/1009
2021/0182625 A1* 6/2021 Arar ...................... G06V 40/193
2021/0192826 A1* 6/2021 Douglas ................ G06T 3/4053

OTHER PUBLICATIONS

Lim, et al., Accelerating Training of DNN in Distributed Machine Learning System with Shared Memory, [received on Nov. 16, 2023]. Retrieved from Internet:<https://ieeexplore.ieee.org/abstract/document/8190900> (Year: 2017).*

Lim, et al., Distributed Deep Learning Framework based on Shared Memory for Fast Deep Neural Network Training, [received on Nov. 16, 2023]. Retrieved from Internet:<https://ieeexplore.ieee.org/abstract/document/8539420> (Year: 2018).*

(Continued)

*Primary Examiner* — Miranda M Huang
*Assistant Examiner* — Bart Rylander
(74) *Attorney, Agent, or Firm* — Holzer Patel Drennan

(57) ABSTRACT

Techniques for shared memory spaces in data and model parallelism are provided to improve memory efficiency and memory access speed. A shared memory space may be established at a host system or in a hardware memory agent. The shared memory may store training data or model parameters for an artificial intelligence model at a memory address in one or more memory circuits. Data for the artificial intelligence model may be processed across a plurality of artificial intelligence accelerators using the training data or the model parameters of the shared memory space. That is, multiple accelerators access one copy of the data from the shared memory space instead of accessing their own separate memory space.

16 Claims, 11 Drawing Sheets

(56) References Cited

OTHER PUBLICATIONS

Stumm, et al., Algorithms Implementing Distributed Shared Memory, [received Nov. 16, 2023]. Retrieved from Internet:<https://ieeexplore.ieee.org/abstract/document/53355> (Year: 1990).*

Ma, et al., A Hypervisor for Shared-Memory FPGA Platforms, [received Nov. 16, 2023]. Retrieved from Internet:<https://dl.acm.org/doi/abs/10.1145/3373376.3378482> (Year: 2020).*

Cohen, E., et al., Theory of multi Core Hypervisor Verification, [received on Apr. 16, 2024]. Retrieved from Internet:<https://link.springer.com/chapter/10.1007/978-3-642-35843-2_1> (Year: 2013).*

Advanced Micro Devices, Inc. AMD I/O Virtualization Technology (IOMMU) Architectural Specification, Rev. 2.0 [received Jul. 29, 2025]. Retrieved from internet:<chrome-extension://efaidnbmnnnibpcajpcglclefindmkaj/https://kib.kiev.ua/x86docs/AMD/IOMMU/48882-2.00.pdf> (Year: 2007).*

First Examination Report Received for Indian Application No. 202317017793, mailed on Oct. 29, 2025, 08 Pages.

First Office Action Received for Chinese Application No. 202180068113.3, mailed on Dec. 26, 2025, 65 Pages. (English Translation Provided).

Lim, et al., “Accelerating Training of DNN in Distributed Machine Learning System with Shared Memory”, In Proceedings of International Conference on Information and Communication Technology Convergence, Oct. 18, 2017, pp. 1209-1212.

“International Search Report and Written Opinion Issued in PCT Application No. PCT/US21/042129”, Mailed Date: Nov. 17, 2021, 11 Pages.

* cited by examiner

SHARED MEMORY SPACES IN DATA AND MODEL PARALLELISM

BACKGROUND

The present disclosure relates to computing, and more particularly to techniques for training a neural network using a shared memory space.

Artificial neural networks (hereinafter, neural network) have become increasingly important in artificial intelligence applications and modern computing in general. An example neural network is shown in FIG. 1. The neural network 100 receives input values corresponding to features to be recognized. The input values are multiplied by weights (represented by edges 101) and added together (e.g., summed) in nodes 102. An activation function is applied to the result in the nodes 102 to generate an output value. Values are combined across multiple nodes and layers of nodes to produce network output values corresponding to a result.

Such systems "learn" to perform tasks by considering examples, generally without being programmed with task-specific rules. Initially, the weights may be untrained. During a training phase, input values for corresponding known results are processed by the network, and a difference (or error) between the network output values and the known values is determined. The weights may be adjusted based on the error using a process known as backpropagation, where computations flow through the neural network in the reverse direction (e.g., from the output to the input). Training may involve successively adjusting weights across many input samples and corresponding known network output values. This is often referred to as the training phase. Once trained, the system may receive inputs and produce meaningful results (e.g., classification or recognition). This is often referred to as the inference phase.

Training for very large neural networks may involve a massive number of computations. Additionally, memory usage is a problem with neural networks in general. Neural networks with large depths may be required to store activations for the whole depth of the network. This problem is compounded when the network uses pipelining, which may cause the memory size to increase significantly. In some neural networks, a pipeline may cause the memory size to grow quadratically, for example.

The present disclosure pertains to neural network training techniques that reduce memory usage, improve speed, and provide other advantages.

SUMMARY

Embodiments of the present disclosure process data for an artificial intelligence model across one or more artificial intelligence accelerators.

In one embodiment, the present disclosure provides a computer system comprising one or more processors, one or more memory circuits, and a plurality of artificial intelligence accelerators. The computer system further comprises a non-transitory computer readable storage medium coupled to the one or more processors and having stored thereon program code. The program code being executable by the one or more processors to establish a shared memory space storing training data or model parameters for an artificial intelligence model at a memory address in the one or more memory circuits. The program code being further executable by the one or more processors to process data for the artificial intelligence model across the plurality of artificial intelligence accelerators using the training data or the model parameters such that each of the plurality of artificial intelligence accelerators obtains the same training data or the same model parameters stored in the shared memory space at the memory address in the one or more memory circuits.

In one embodiment, the present disclosure provides a method of processing an artificial intelligence model. The method comprises establishing a shared memory space storing training data or model parameters for an artificial intelligence model at a memory address in one or more memory circuits. The method further comprises processing data for the artificial intelligence model across a plurality of artificial intelligence accelerators using the training data or the model parameters such that each of the plurality of artificial intelligence accelerators obtains the same training data or the same model parameters stored in the shared memory space at the memory address in the one or more memory circuits.

In one embodiment, the present disclosure provides a non-transitory computer readable storage medium having stored thereon program code executable by a computer system. The program code causes the computer system to establish a shared memory space storing training data or model parameters for an artificial intelligence model at a memory address in one or more memory circuits. The program code further causes the computer system to process data for the artificial intelligence model across a plurality of artificial intelligence accelerators using the training data or the model parameters, wherein each of the plurality of artificial intelligence accelerators obtains the same training data or the same model parameters stored in the shared memory space at the memory address in the one or more memory circuits.

BRIEF DESCRIPTION OF THE DRAWINGS

Various embodiments of the present disclosure are illustrated by way of example and not limitation in the figures of the accompanying drawings.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

As mentioned above, training for very large neural networks may involve a massive number of computations. Additionally, memory usage is a problem with neural networks in general. Neural networks with large depths may be required to store activations for the whole depth of the network.

In one example of training a neural network, four layers used. Training of the neural network includes four forward operations (f1-f4) and four backward operations (b4-b1). Input data "A" is received as an input of the pipeline and is successively processed by each layer, forwards and backwards. Input data may be continuously received by the network to produce a stream of output results. One challenge with training some neural networks is that networks with large numbers of layers require more memory. For instance, each layer may be required to store activations to be able to perform backpropagation. For example, a first forward operation (f1) receives input and determines intermediate activations (referred to as "activations" herein) based on the input, and outputs an output activation (referred to as "outputs" herein) to the second forward operation (f2). The output activation may be referred to as a tensor. The intermediate activations 203 may be used by the corresponding backward operation (b1). The backwards operations may include one or more operations generated using the forward operation with auto differentiation, for example. Accordingly, the intermediate activations may be stashed (e.g., stored in a buffer) until the corresponding backward operation (B1) is commenced, after all of the other intermediate forward and backward operations are performed.

In some cases, training a neural network is compute-intensive and may take days to weeks to complete, due to the large amount of training data and the large size of the model. As such, a multi-device (e.g., artificial intelligence accelerator device) platforms may be adopted to speed up neural network training through parallel execution. For instance, the neural network model may be partitioned among multiple devices using model parallelism techniques or the training data may be partitioned among multiple devices using data parallelism techniques, as further described below.

Figure 1:
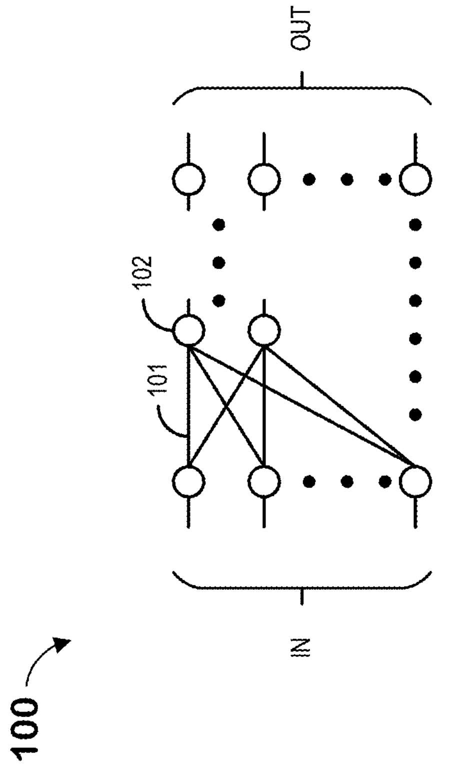
FIG. 1 shows a diagram of a neural network.
Figure 2:
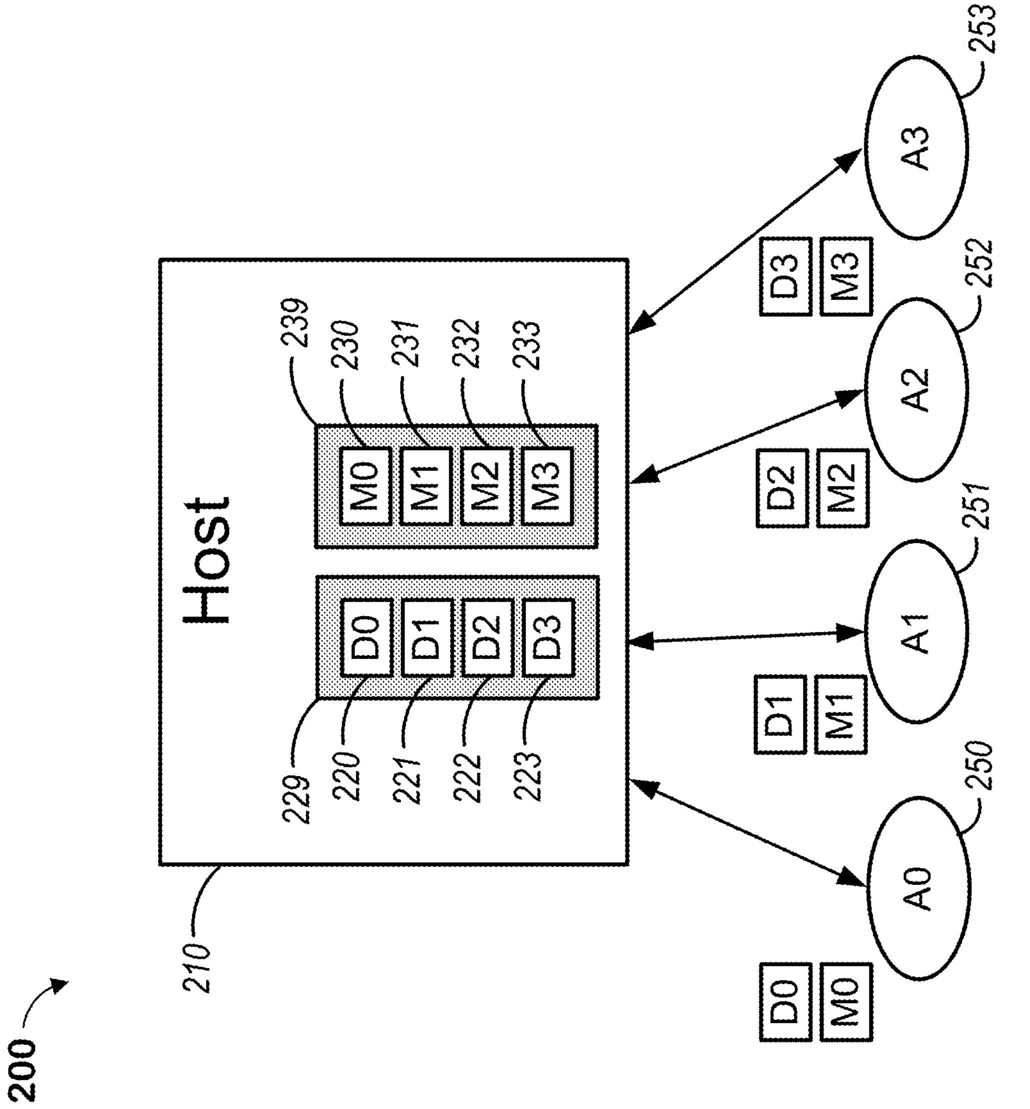
FIG. 2 shows a diagram of a host system in communication with a plurality of artificial intelligence accelerators.

FIG. 2 shows a diagram of a host system 210 in communication with a plurality of artificial intelligence accelerator devices 250, 251, 252, and 253. The host system 210 may comprise one or more computer servers and may be configured to setup and initiate training of a neural network. The host system may include one or more central processing units (not shown) based on the x86 architecture, for example. The host system 210 may be configured to design, setup, and initiate training of a neural network or other artificial intelligence model. The host system 210 may also be referred to as a "parameter server" or "param server."

In this embodiment, the host system 210 is coupled to four accelerator devices: a first accelerator device (A0) 250, a second accelerator device (A1) 251, a third accelerator device (A2) 252, and a fourth accelerator device (A3) 253. In other embodiments, a different number of accelerator devices may be used.

The accelerator devices (A0-A3) 250-253 may be artificial intelligence hardware accelerators and may be designed to accelerate an artificial neural network, for example. In some embodiments, the accelerator devices A0-A3 may comprise graphics processing units (GPUs). In other embodiments, the accelerator devices may be a field programmable date array (FPGA) or an application-specific integrated circuit (ASIC). The accelerator devices (A0-A3) 250-253 may be coupled to the host system 210 using a peripheral component interconnect express (PCIe) bus. As such, they accelerator devices (A0-A3) 250-253 may a physical part of the host system 210.

As mentioned above, the neural network model may be partitioned among multiple devices using model parallelism techniques and the training data may be partitioned among multiple devices using data parallelism techniques. In a data parallel training system, each worker (e.g., accelerator device) obtains a subset of the training data (e.g., a "mini-batch"), executes forwards and backwards passes, and computes gradients. The gradients are then are further averaged or reduced in order to update the model parameters (e.g., weights). Data-parallel distributed training systems may use approaches such as data parallelism and model parallelism. In data parallelism techniques, a copy of the model runs on each accelerator device and different data is sent by the host system to each accelerator device. In one form of model parallelism, an artificial intelligence model is split across many accelerator devices, and the host system sends the same subset of the training data to each accelerator device.

As shown in FIG. 2, the host system 210 includes a training data memory space 229 and a separate model parameter memory space 239. These memory spaces 229, 239 may be allocated within dynamic random-access memory (DRAM) of the host system 210, which may be coupled to the one or more CPUs of the host system 210. In this embodiment, the training data memory space 229 includes training data for training a neural network that have been segmented into four subsets (e.g., batches): a first training data subset (D0) 220, a second training data subset (D1) 221, a third training data subset (D2) 222, and a fourth training data subset (D3) 223. In this embodiment, the model parameter memory space 239 includes model parameters (e.g., weights) that have been segmented into four subsets: a first model parameter subset (M0) 230, a second model parameter subset (M1) 231, a third model parameter subset (M2) 232, and a fourth model parameter subset (M3) 232. In other embodiments, the training data and model parameters may be segmented into different numbers of subsets.

The host system 210 performs memory assignment for the accelerator devices 250-253 such that each accelerator device uses a separate memory space. In this example, each accelerator device A0, A1, A2, and A3 accesses a separate memory space for the model parameters M0, M1, M2, and M3, (e.g., weights) and for the training data D0, D1, D2, and D3, respectively.

The host system 210 implements both data parallelism and models parallelism techniques such that the first accelerator device (A0) 250 accesses the first training data subset (D0) 220 and the first model parameter subset (M0) 230, the second accelerator device (A1) 251 accesses the second training data subset (D1) 221 and the second model parameter subset (M1) 231, the third accelerator device (A2) 252 accesses the third training data subset (D2) 222 and the third model parameter subset (M2) 232, and the fourth accelerator device (A3) 253 accesses the fourth training data subset (D3) 223 and the fourth model parameter subset (M3) 233.

While use of multiple accelerator devices along with data parallelism techniques and model parallelism techniques may improve efficiency, in some cases the host system 210 memory may be heavily taxed by repeated lookups for the same content (e.g., the same subset of training data or the same model parameters) even when the content is identical across all accelerator devices (A0-A3) 250-253. This inefficient use of memory may be a result of the host system, in conjunction with the device driver for the accelerator devices, keeping a separate version of the training data and the model parameters for each different accelerator device as shown in FIG. 2.

The accelerator device driver is a computer program that operates and controls the accelerator device. The device driver may provide a software interface to enabling the host device's CPUs to access hardware functions of the accelerator devices. In some cases, the device driver may require each accelerator to have a separate pin-able memory space for sending data as well as parameters. As such, the host system 210 may provide each accelerator device with its own separate memory space. In some cases, it may be possible to modify certain settings of the device driver, but it may not be possible to change the requirement that each device have its own separate memory. Such a requirement may have been set by a manufacturer of the accelerator device, for example.

Separate memory spaces, as shown in FIG. 2, may be problematic in large memory models (e.g., spanning billions or trillions of parameters) because that architecture may impose a large burden on memory, causing memory storage inefficiency. For example, for the identical portion of the model, the host system may need to store four different versions (e.g., one for each accelerator device) instead of a single copy. The memory efficiency problems may get worse if there are also four different versions of gradients and momentums. Furthermore, on sending model parameters (e.g., weights), the host system may need to load to each device by separately reading from memory, thereby requiring four times the bandwidth. Similarly, arriving gradients may also make multiple accesses with at least one access for each accelerator device.

This disclosure provides techniques for shared memory spaces in data and model parallelism to improve memory efficiency, and memory access speed. This technique provides a memory space shared between accelerator devices that enhances performance in either data or model parallelism. The software architecture consisting of the user-space param-server and the device driver are manipulated to have both separate as well as shared spaces, as further described below. The memory allocated to the parameter space may be shared between all devices either directly or via aliasing, as further described below.

Figure 3:
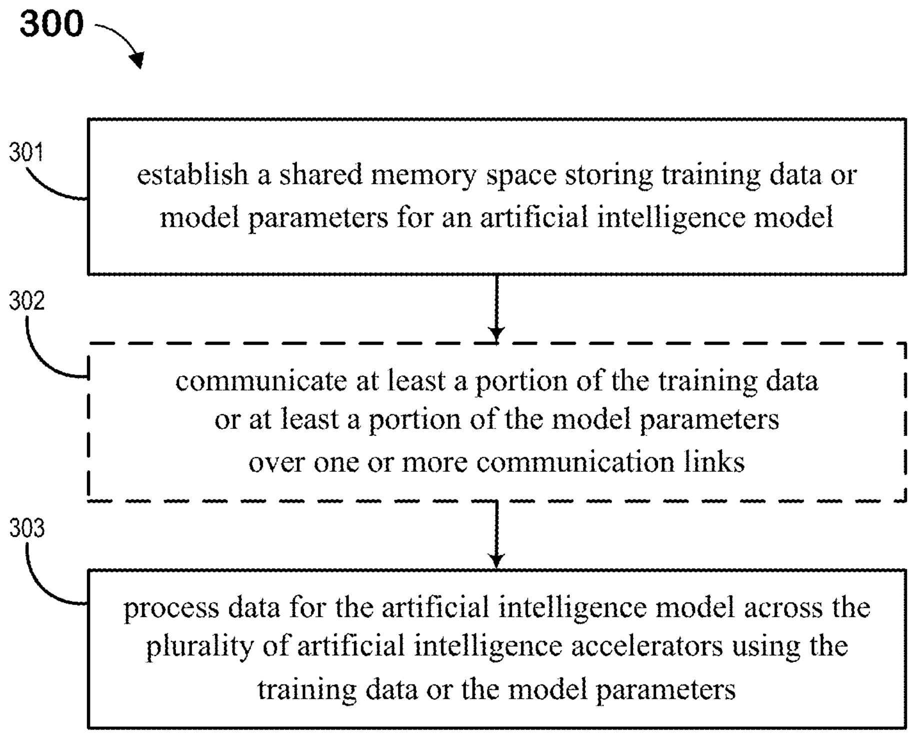
FIG. 3 shows a flowchart of a method of processing an artificial intelligence model, according to an embodiment.

FIG. 3 shows a flowchart 300 of a method of processing an artificial intelligence model, according to an embodiment. The method uses techniques for shared memory spaces in data and model parallelism to improve memory efficiency. The method may be implemented by a host system as described herein.

At 301, the method of processing an artificial intelligence model establishes a shared memory space storing training data or model parameters for an artificial intelligence model at a memory address in one or more memory circuits.

At 302, the method optionally communicates at least a portion of the training data or at least a portion of the model parameters over one or more communication links between artificial intelligence accelerators. The links between accelerator devices may have a higher bandwidth than a link between the accelerator and a processing unit of the host system. In this way, each accelerator may receive a portion of data which can then be shared or aggregated over the higher speed links. In some embodiments, the accelerator device may not have such high speed links. This communication may occur when the accelerators are coupled using such links, and in certain situations, as further described below.

At 303, the method processes data for the artificial intelligence model across a plurality of artificial intelligence accelerators using the training data or the model parameters such that each of the plurality of artificial intelligence accelerators obtains the same training data or the same model parameters stored in the shared memory space at the memory address in the one or more memory circuits.

In some embodiments, the shared memory space is readable by the plurality of artificial intelligence accelerators using a direct memory access page number. In such embodiments, the plurality of artificial intelligence accelerators may not be configured to write to the shared memory.

In some embodiments, a memory agent device comprises the one or more memory circuits storing the storing training data or the model parameters. In such embodiments, the memory agent device may be a field-programmable gate array or an application-specific integrated circuit. In such embodiments, the memory agent device may store a mapping of virtual page numbers used by the plurality of artificial intelligence accelerators to physical page numbers of the one or more memory circuits of the memory agent device. In such embodiments, the memory agent device may comprise a shared buffer and may be configured to cache the training data or the model parameters in the shared buffer when a first accelerator of the plurality of artificial intelligence accelerators accesses the training data or the model parameters until each of the plurality of artificial intelligence accelerators has accessed the training data or the model parameters.

In some embodiments, the memory agent device may increment a counter when each of the plurality of artificial intelligence accelerators accesses the training data or the model parameters and the memory agent device may reset the counter when it is equal to a number of accelerators in the plurality of artificial intelligence accelerators.

These techniques for shared memory spaces in data and model parallelism are further described below.

Figure 4:
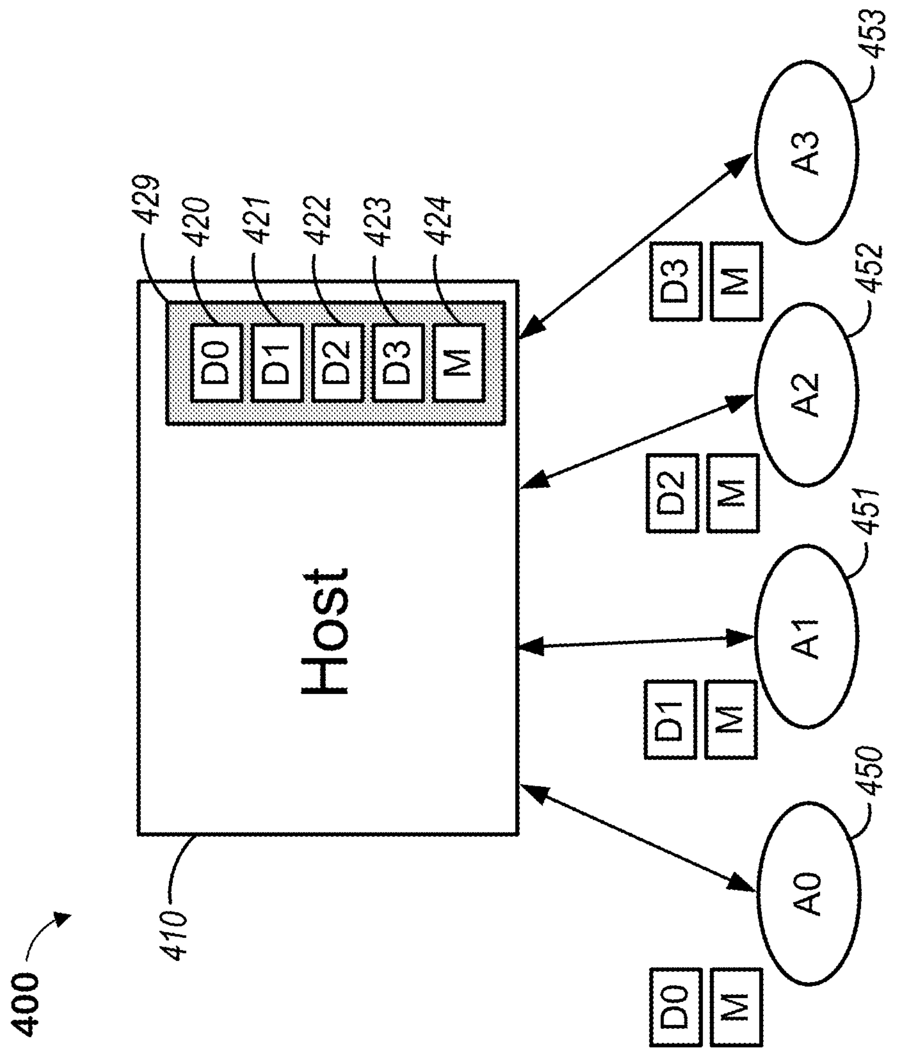
FIG. 4 shows a diagram of data parallelism techniques using a shared memory space, according to an embodiment.

FIG. 4 shows a diagram 400 of data parallelism techniques using a shared memory space 429, according to an embodiment. A host system 410 is coupled to four accelerator devices: a first accelerator device (A0) 450, a second accelerator device (A1) 451, a third accelerator device (A2) 452, and a fourth accelerator device (A3) 453. In other embodiments, a different number of accelerator devices may be used. In some embodiments, there may be one or more high speed links between the accelerator devices.

The host system 410 may be configured similar to the host system 210 described above, except as described below. The accelerator devices (A0-A3) 450-253 may be configured similar to the accelerator device 250-253 described above, except as described below. One difference compared to the host system 210 of FIG. 2 is that the host system 410 of FIG. 4 establishes a shared memory space 424 for the model (M) 424 in memory 429 and the accelerators (A0-A3) 450-452 of FIG. 4 may access the shared model space 424 while accessing separate data spaces 420, 421, 422, and 423.

In data parallelism, the shared memory space 424 for the model (M) in the memory 429 may be used by the accelerator devices 450-453 to share the model (M) 424, which is common between all devices. However, each of the accelerator may access different portions of data. For instance, the first accelerator (A0) 450 may access first data (D0) 420, the second accelerator (A1) 451 may access second data (D1) 421, the third accelerator (A2) 452 may access third data (D2) 422, and the fourth accelerator (A3) may access fourth data (D3) 423. This memory allocation is shown in FIG. 4.

Features and advantages of the shared memory space 242 for the model (M) include reduced memory space consumption. This advantage becomes more pronounced when using shared memory space for large data structures spanning into gigabytes and terabytes instead of separate memory spaces.

Figure 5:
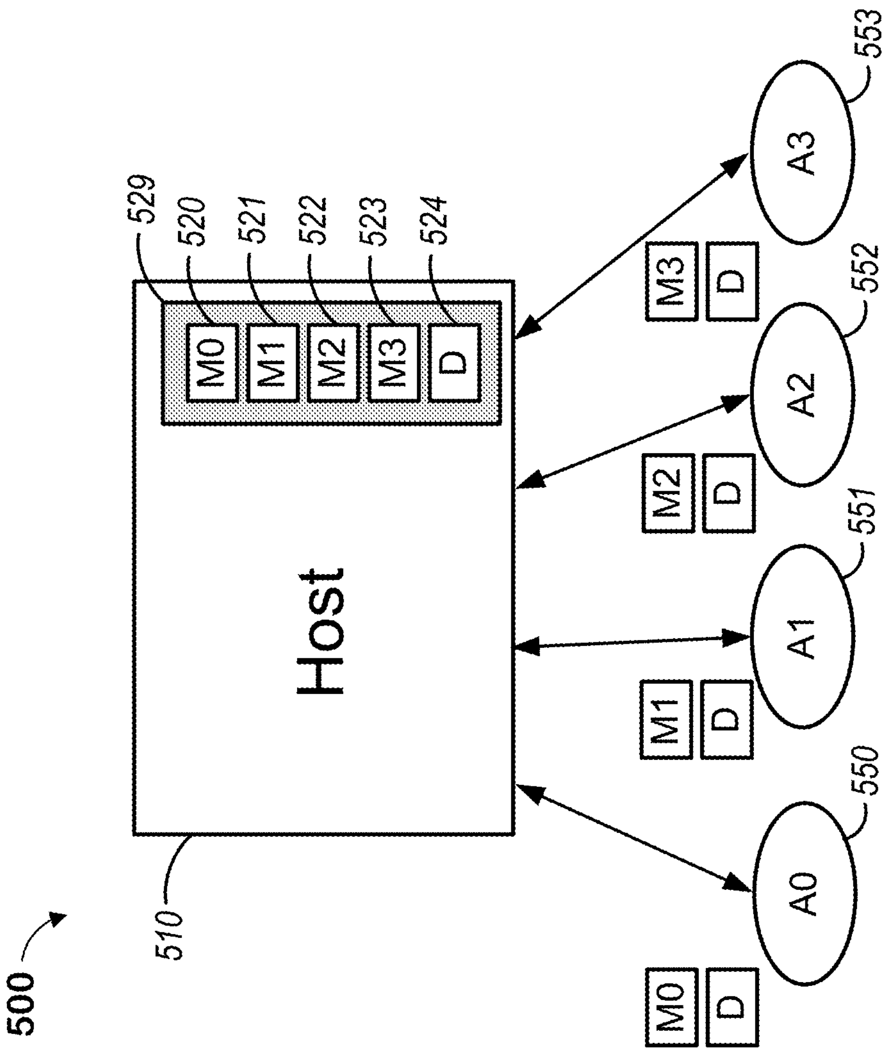
FIG. 5 shows a diagram of multi-model and model parallelism techniques using a shared memory space, according to an embodiment.

A shared memory space is advantageous when applied with data parallelism techniques as described above with respect to FIG. 4. In addition, the shared memory space techniques also improve memory efficiency when applied with model parallelism techniques or multi-model techniques. FIG. 5 shows a diagram 500 of multi-model and model parallelism techniques using a shared memory space, according to an embodiment. In FIG. 5, a host system 510 is coupled to four accelerator devices: a first accelerator device (A0) 550, a second accelerator device (A1) 551, a third accelerator device (A2) 552, and a fourth accelerator device (A3) 553. In other embodiments, a different number of accelerator devices may be used. In some embodiments, there may be one or more high speed links between the accelerator devices.

The host system 510 may be configured similar to the host system 210 described above, except as described below. The accelerator devices (A0-A3) 550-553 may be configured similar to the accelerator device 250-253 described above, except as described below. One difference compared to the host system 210 of FIG. 2 is that the host system 410 of FIG. 4 establishes a shared memory space 524 for the training data (D) 524 in memory 529 and the accelerators (A0-A3) 550-552 of FIG. 5 may access the shared training data space 524 while accessing separate model parameter spaces 520, 521, 522, and 523. When using multi-model techniques, the separate model parameter spaces (M0, M1, M2, and M3) may correspond to different models. When using model parallelism techniques, the separate model parameter spaces (M0, M1, M2, and M3) may correspond to different portions of the same model.

In some embodiments using model parallelism, the same training data (D) is provided from the host across the multiple accelerator devices (A0-A3). One example may be a multi-head attention transformer or vision model whose input layer has such a high number of convolution filters that it is spread across accelerator devices.

In some embodiments, the training data (D) may be very large in size, such as with radiology models where images are large multi-dimensional scans, for example. In some embodiments, the training data (D) may be smaller and high-throughput, such as with mapping data from self-driving cars.

Using the shared memory space 524 for the training data (D) advantageously allows the host system 510 to read the same shared data (D) 524 only once and then provide that data (D) to all accelerator devices (A0-A3), thereby providing savings in CPU bandwidth and memory storage. For instance, since the shared data is read only once, fewer lookup operations to retrieve the data are performed compared to systems that use separate data storage for each accelerator device.

As mentioned above, some embodiments may include high speed links between accelerator devices. These links be "high speed" in the sense that they have higher bandwidth than the communication link between the host system's CPU and the accelerator device. In some embodiments, the high speed links have 6 or 8 times greater bandwidth, for example. These high speed links may be wire-based serial multi-lane near-range communications links, for example. The techniques for shared memory spaces described herein may also provide advantages, even when the accelerator devices have high speed links, as described below with respect to FIG. 6 and FIG. 7.

Figure 6:
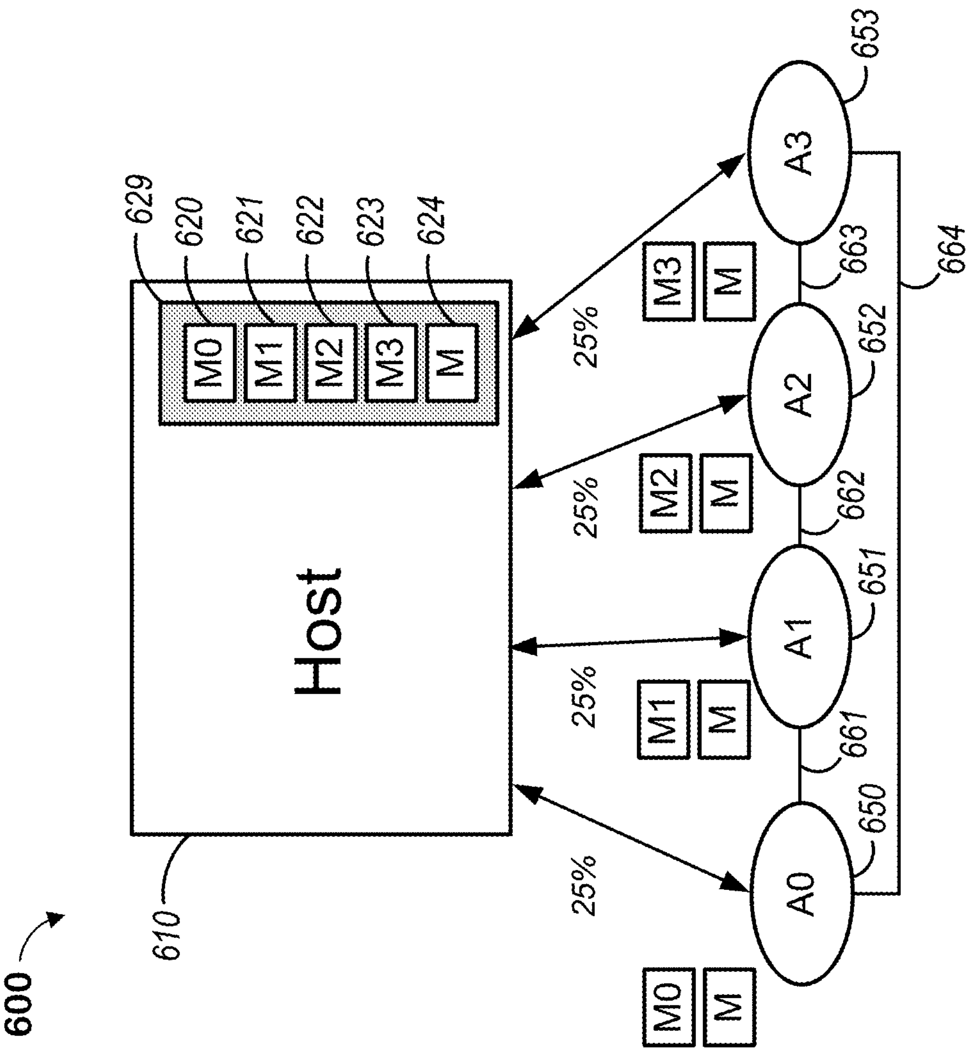
FIG. 6 shows a diagram of links between accelerators, according to an embodiment.

FIG. 6 shows a diagram 600 of links between accelerators, according to an embodiment. A host system 610 is coupled to four accelerator devices: a first accelerator device (A0) 650, a second accelerator device (A1) 651, a third accelerator device (A2) 652, and a fourth accelerator device (A3) 653. In other embodiments, a different number of accelerator devices may be used.

The host system 610 may be configured similar to the host system 210 described above, except as described below. The accelerator devices (A0-A3) 550-553 may be configured similar to the accelerator device 250-253 described above, except as described below. For instance, in this embodiment there are high speed links between the accelerator devices (A0-A3). There is a first high speed link 661 between the first accelerator device (A0) 650 and the second accelerator device (A1) 651. There is a second high speed link 662 between the second accelerator device (A1) 651 and the third accelerator device (A2) 652. There is a third high speed link 663 between the third accelerator device (A2) 652 and the fourth accelerator device (A3) 653. And there is a fourth high speed link 664 between the fourth accelerator device (A3) 653 and the first accelerator device (A0) 650.

Since there are high speed links between the accelerator devices, it may be possible for the host system to transmit different portion (e.g., 25%) of the model (M) to each accelerator device. For instance, a first portion (M0) 620 of the model (M) 624 may be transmitted to the first accelerator device (A0) 650, a second portion (M1) 621 of the model (M) 624 may be transmitted to the second accelerator device (A1) 651, a third portion (M2) 622 of the model (M) 624 may be transmitted to the third accelerator device (A2) 652, and a fourth portion (M3) 623 of the model (M) 624 may be transmitted to the fourth accelerator device (A3) 653. Then, the accelerator devices (A0-A3) 650-653 may perform an all-gather technique using the high speed links to construct the model (M) 624. However, even in situations where there are high speed links and the opportunity to use an all-gather process to improve performance, efficiency may still be further improved by implemented a shared memory space as described herein.

Figure 7:
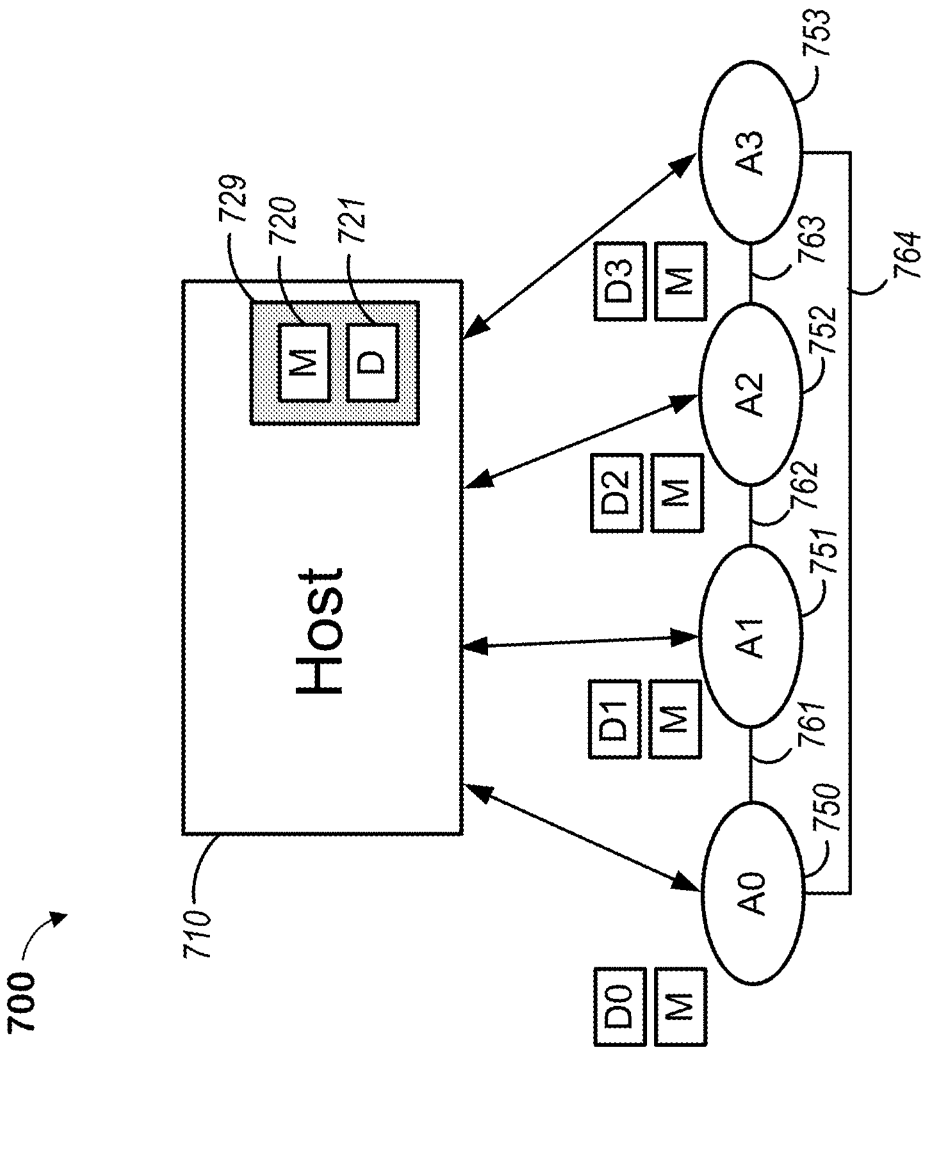
FIG. 7 shows a diagram of data augmentation techniques, according to an embodiment.

For example, a shared memory space may still improve memory efficiency in a system performing different augmentation techniques on the same data, where the differently augmented data is applied to a different model. FIG. 7 shows a diagram 700 of data augmentation techniques, according to an embodiment. A host system 710 is coupled to four accelerator devices: a first accelerator device (A0) 750, a second accelerator device (A1) 751, a third accelerator device (A2) 752, and a fourth accelerator device (A3) 753. In other embodiments, a different number of accelerator devices may be used.

In this embodiment there are high speed links between the accelerator devices (A0-A3). There is a first high speed link 761 between the first accelerator device (A0) 650 and the second accelerator device (A1) 751. There is a second high speed link 762 between the second accelerator device (A1) 751 and the third accelerator device (A2) 752. There is a third high speed link 763 between the third accelerator device (A2) 752 and the fourth accelerator device (A3) 753. And there is a fourth high speed link 764 between the fourth accelerator device (A3) 753 and the first accelerator device (A0) 750.

The host system 710 may be configured similar to the host system 610 of FIG. 6 described above, except as described below. The accelerator devices (A0-A3) 750-753 may be configured similar to the accelerator device 650-653 of FIG. 6 described above, except as described below. For instance, in FIG. 7 the data (D) provided to each model (M) may be augmented, modified, or manipulated. For example, when mapping self-driving car videos, a fog or haze may be added to the video frame for one of the accelerators, rain may be added for the same original frame for another accelerator, and partial obfuscation for a third accelerator. This superimposition may happen via computation, thereby saving bandwidth and capacity in memory of the data.

In this embodiment, the same data (D) 721 may be manipulated by different functions to generate different data outputs (D0, D1, D2, and D3) for each different accelerator device (A0-A3). The original data (D) may be preserved in one copy in the memory 729, and may be read by the host system 710 once, thereby reducing lookups and reducing the memory storage used and improving efficiency. The various functions may be applied to the data (D) to generate different manipulated (or augmented) data outputs (D0-D3). These data outputs (D0-D3) are provided to the different accelerator devices (A0-A3), respectively.

As such, even in systems having high speed links between the accelerator devices, the techniques for shared memory spaces provide may improved efficiency, such as when the same data is used for different accelerators but the accelerators may not be able to take advantage of an all-gather technique due to different augmentations or modifications performed on data provided to the accelerators.

The techniques for shared memory spaces described above are software based techniques that may be configured by the accelerator device driver software. AS described above, the device driver can create a pin-able memory space shared by all of the accelerator devices. The device driver may export the same physical pages (e.g., memory addresses) to multiple virtual memory spaces such that the physical page is shared among multiple accelerator devices as one read-only direct-memory-access page. In order to prevent a readers-writers problem (writes occurring during reading), the host system may be configured to write to the shared memory space while the accelerator devices may not be configured to write to the shared memory space. Furthermore, until the host system performs the update, whether it is model parameters or training data, the accelerator devices (readers) may not access the shared memory space.

Thus, an accelerator driver software may be configured to provide shared memory spaces as described above. However, it may not be possible to modify the accelerator driver software in all cases. In some situations, portions of the accelerator device driver software may be set by the device manufacturer and that portion of the software may not be modified.

Instead of using a software implementation, a memory agent hardware device may be used to provide shared memory spaces as further described below.

Figure 8:
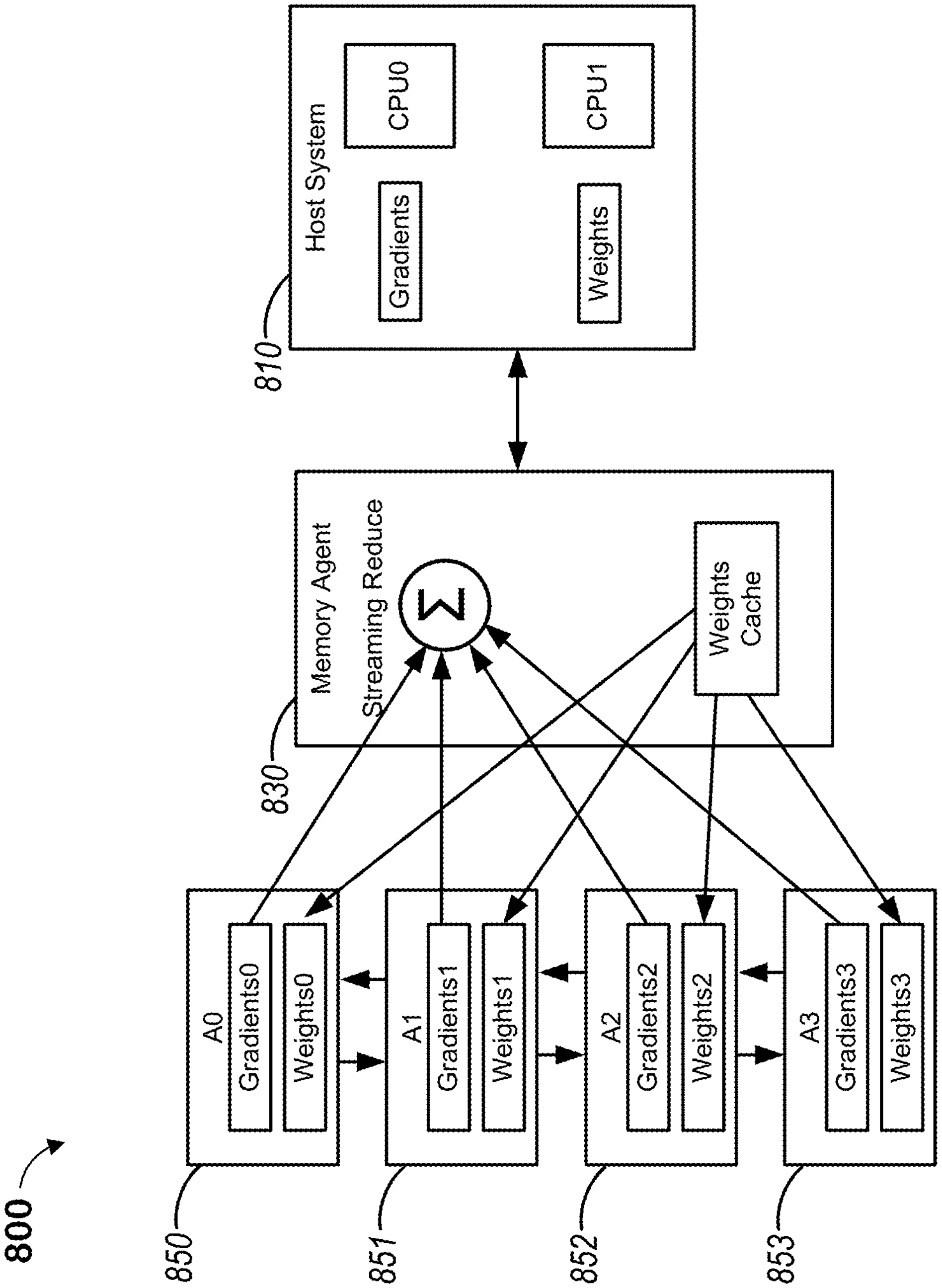
FIG. 8 shows a memory agent device coupled between accelerator devices and a host system, according to an embodiment.

FIG. 8 shows a diagram 800 of a memory agent device 830 coupled between accelerator devices 850, 851, 852, and 853 and a host system 810, according to an embodiment. The parameter server 810 may be configured similar to the host system 210 described above with respect to FIG. 2. The accelerator devices (A0-A3) 850-853 may be configured similar to the accelerator devices 250-253 described above.

In this embodiment, the device driver software may not be modified. The device driver software may continue to use multiple address spaces, at least one for each device. That is, the device driver software does not implement shared memory spaces. However, an unconventional hardware memory agent 830 may be coupled between the device driver of the host system 410 and the physical memory of the memory agent 830. The memory agent 830 may be an FPGA or an ASIC in some embodiments. The memory agent 830 may "alias" certain memory spaces through a programmable table with a many-to-one mapping translating requests from different devices for param-space to the same param-space. Furthermore, the memory agent 830 may temporarily share values in on-chip memory space such that secondary accesses of the same data by other accelerator devices may be satisfied from the cache, thereby improving performance. The memory agent 830 is further described below with respect to FIG. 9.

Figure 9:
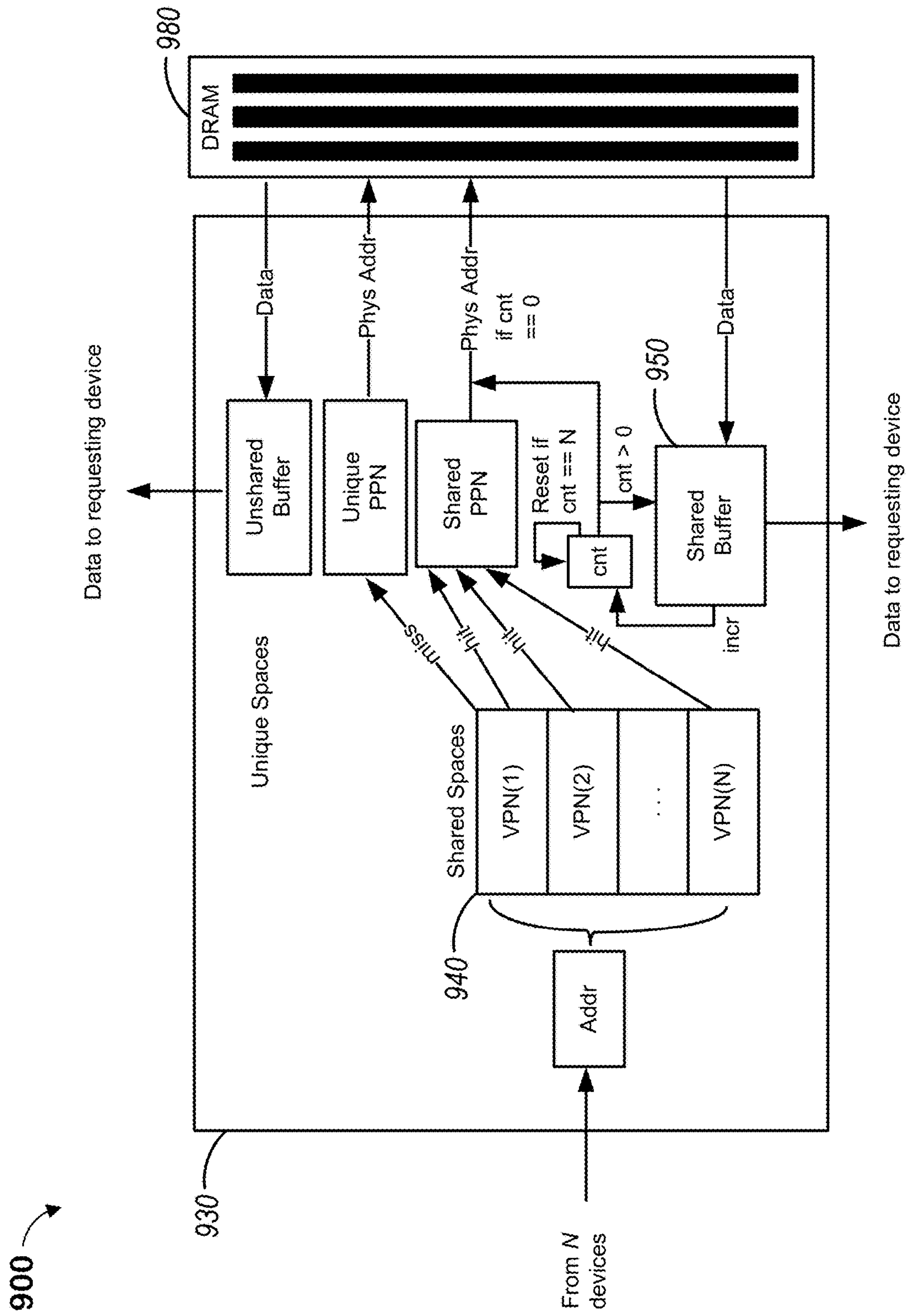
FIG. 9 shows a diagram of a memory agent mapping virtual pages to the same physical page, according to an embodiment.

FIG. 9 shows a diagram 900 of a memory agent 930 mapping virtual pages 940 to the same physical page, according to an embodiment. The memory agent 930 of FIG. 9 may be configured similar to the memory agent 830 of FIG. 8 described above. The memory agent 930 may classify device addresses to unique or shared spaces. In the shared space, multiple devices may share the same page (e.g., physical page number (PPN)). Compared to the device driver software techniques described above, the memory agent uses its own memory to provide the shared memory space instead of the host system providing the shared memory space.

In this embodiment, the accelerator devices operate as if they are accessing the host system memory and the device driver of the host system operates as if the accelerator devices are using separate memory spaces. The memory agent solution requires no modification to the device driver. The memory agent 930 takes the addresses from the device driver, stores them as a table or array 940 of virtual page numbers (VPN) and creates a many to one mapping of VPNs to physical page numbers (PPN). As such, the memory agent 930 can provide a shared memory space without modifying the device driver. If a memory address or page number (addr) received from an accelerator device matches a VPN in the table 940, that it a "hit" and the device will access a shared physical page number (e.g., memory address) in the dynamic random access memory (DRAM) 980 of the memory agent 930. The memory agent 930 may retrieve the request data from the host system (shown in FIG. 8) and store the requested data in the memory agent's DRAM 980.

If the address received from the device does not match a VPN in the table 940, that is a "miss" and the memory agent will access a unique (non-shared) PPN in the DRAM 980.

To further improve efficiency by reducing lookup operations, when a shared PPN is accessed, the memory agent stores the requested data in a shared buffer 950 until each accelerator device has accessed that data. Referring back to the device driver software solution above, it is possible that the Host System's CPU cache may be hit. However, there may not be a cache hit if the time between requests from the accelerators is too long. The hardware memory agent solution improves upon this by using a counter (cnt) to track how many accelerators have accessed the same shared data and the data may not be released from the shared buffer 950 until each accelerator device has access that shared data. For example, if the counter is set to 0, the memory agent may access the host system and increment the counter to 1. When the next accelerator accesses that same shared data, the counter is checked to determine whether it is greater than 0. In this example the counter is now 1 and so the memory agent can access the shared buffer 950 instead of accessing the host system. Then the counter is incremented to 2 (indicating that two accelerators have accessed the shared data). The counter may be reset to 0 after all of the accelerator devices have accessed the shared data (e.g., when the counter equals N, the number of accelerator devices).

As such, the hardware memory agent technique may be used in situations where the device driver software does not provide for shared memory spaces. In addition, it may provide improved performance over the device driver software solution since the shared buffer 950 can implement a counter to ensure a cache hit, whereas the host system's CPU may not ensure a cache hit.

Figure 10:
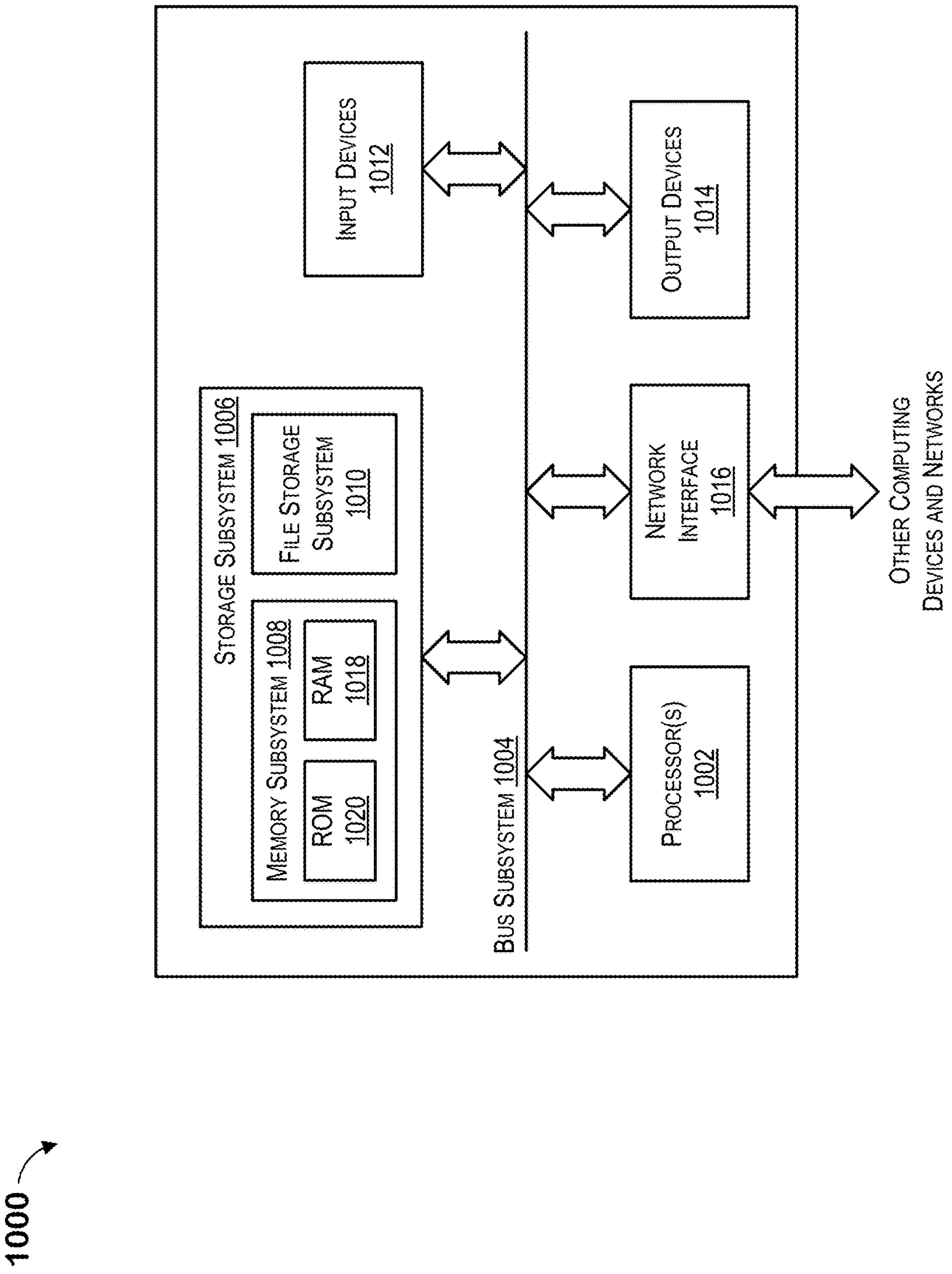
FIG. 10 depicts a simplified block diagram of an example computer system according to certain embodiments.

The techniques describe above may be implemented in a wide range of computer systems configured to process neural networks. FIG. 10 depicts a simplified block diagram 1000 of an example computer system 1000, which can be used to implement the techniques described in the foregoing disclosure. As shown in FIG. 10, computer system 1000 includes one or more processors 1002 that communicate with a number of peripheral devices via a bus subsystem 1004. These peripheral devices may include a storage subsystem 1006 (e.g., comprising a memory subsystem 1008 and a file storage subsystem 1010) and a network interface subsystem 1016. Some computer systems may further include user interface input devices 1012 and/or user interface output devices 1014.

Bus subsystem 1004 can provide a mechanism for letting the various components and subsystems of computer system 1000 communicate with each other as intended. Although bus subsystem 1004 is shown schematically as a single bus, alternative embodiments of the bus subsystem can utilize multiple busses.

Network interface subsystem 1016 can serve as an interface for communicating data between computer system 1000 and other computer systems or networks. Embodiments of network interface subsystem 1016 can include, e.g., Ethernet, a Wi-Fi and/or cellular adapter, a modem (telephone, satellite, cable, ISDN, etc.), digital subscriber line (DSL) units, and/or the like.

Storage subsystem 1006 includes a memory subsystem 1008 and a file/disk storage subsystem 1010. Subsystems 1008 and 1010 as well as other memories described herein are examples of non-transitory computer-readable storage media that can store executable program code and/or data that provide the functionality of embodiments of the present disclosure.

Memory subsystem 1008 includes a number of memories including a main random access memory (RAM) 1018 for storage of instructions and data during program execution and a read-only memory (ROM) 1020 in which fixed instructions are stored. File storage subsystem 1010 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1000 is illustrative and many other configurations having more or fewer components than system 1000 are possible.

Figure 11:
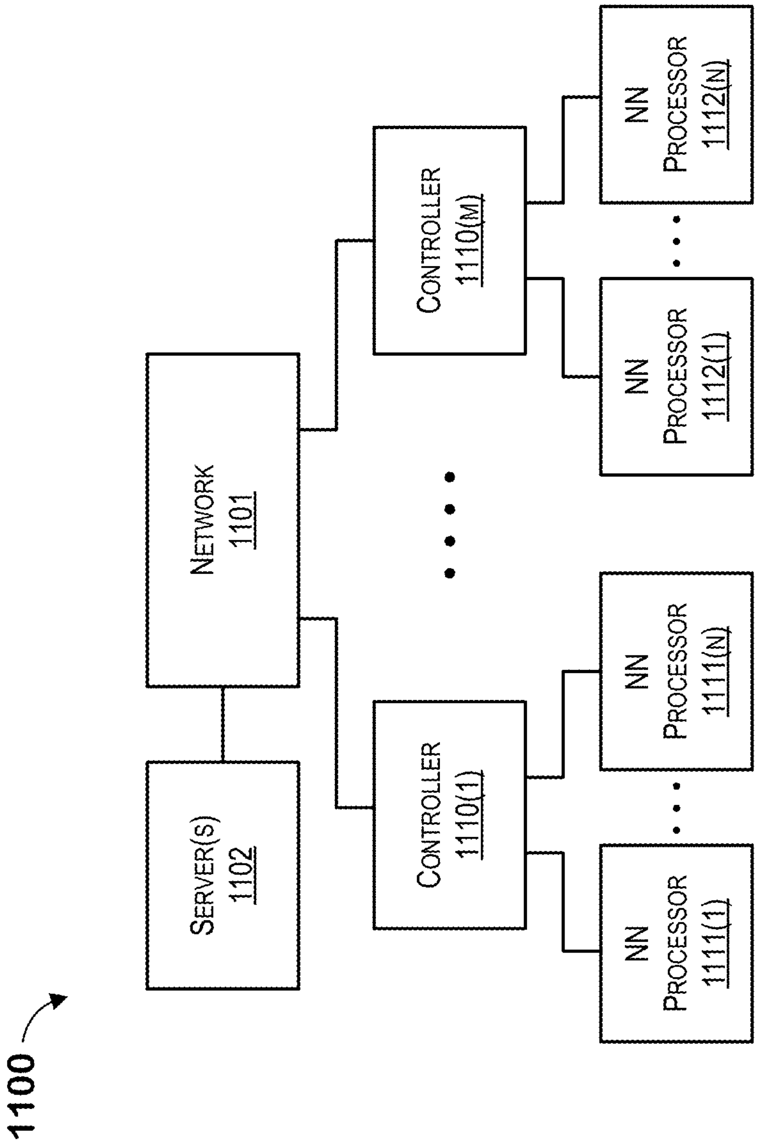
FIG. 11 illustrates a neural network processing system according to some embodiments.

FIG. 11 illustrates a neural network processing system 1100 according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example.

In this example environment, one or more servers 1102, which may comprise architectures illustrated in FIG. 10 above, may be coupled to a plurality of controllers 1110(1)-1110(M) over a communication network 1101 (e.g. switches, routers, etc.). The controllers 1110(1)-1110(M) may also comprise architectures illustrated in FIG. 10 above. Each controller 1110(1)-1110(M) may be coupled to one or more NN processors, such as the processors 1111(1)-1111(N) and 1112(1)-1112(N), for example. The NN processors 1111(1)-1111(N) and 1112(1)-1112(N) may include a variety of configurations of functional processing blocks and memory optimized for neural network processing, such as training or inference. The NN processors are optimized for neural network computations. The server 1102 may configure the controllers 1110 with the NN models as well as input data to the models, which may be loaded and executed by the NN processors 1111(1)-1111(N) and 1112(1)-1112(N) in parallel, for example. The models may include layers and associated weights as described above, for example. The NN processors may load the models and apply the inputs to produce output results. The NN processors may also implement training algorithms described herein, for example.

Further Example Embodiments

In various embodiments, the present disclosure includes systems, methods, and apparatuses for processing an artificial intelligence model.

In one embodiment, the present disclosure provides a computer system comprising one or more processors, one or more memory circuits, and a plurality of artificial intelligence accelerators. The computer system further comprises a non-transitory computer readable storage medium coupled to the one or more processors and having stored thereon program code. The program code being executable by the one or more processors to establish a shared memory space storing training data or model parameters for an artificial intelligence model at a memory address in the one or more memory circuits. The program code being further executable by the one or more processors to process data for the artificial intelligence model across the plurality of artificial intelligence accelerators using the training data or the model parameters such that each of the plurality of artificial intelligence accelerators obtains the same training data or the same model parameters stored in the shared memory space at the memory address in the one or more memory circuits.

In some embodiments, the computer system further comprises one or more communication links between accelerators of the plurality of artificial intelligence accelerators. In such embodiments, the program code may be further executable by the one or more processors to initiate communication of at least a portion of the training data or at least a portion of the model parameters over the one or more communication links.

In some embodiments, the one or more memory circuits are coupled to the one or more processors and the shared memory space is readable by the plurality of artificial intelligence accelerators using a direct memory access page number.

In some embodiments, the one or more processors are configured to write to the shared memory space and the plurality of artificial intelligence accelerators are not configured to write to the shared memory.

In some embodiments, the computer system further comprises a memory agent device coupled between the plurality of artificial intelligence accelerators and the one or more processors. In such embodiments, the memory agent device may comprise the one or more memory circuits storing the storing training data or the model parameters. In such embodiments, the memory agent device may be a field-programmable gate array or an application-specific integrated circuit. In such embodiments, the memory agent device may store a mapping of virtual page numbers used by the plurality of artificial intelligence accelerators to physical page numbers of the one or more memory circuits of the memory agent device. In such embodiments, the memory agent device may comprise a shared buffer and may be configured to cache the training data or the model parameters in the shared buffer when a first accelerator of the plurality of artificial intelligence accelerators accesses the training data or the model parameters until each of the plurality of artificial intelligence accelerators has accessed the training data or the model parameters. In such embodiments, the memory agent device may increment a counter when each of the plurality of artificial intelligence accelerators accesses the training data or the model parameters and may reset the counter when it is equal to a number of accelerators in the plurality of artificial intelligence accelerators.

In one embodiment, the present disclosure provides a method of processing an artificial intelligence model. The method comprises establishing a shared memory space storing training data or model parameters for an artificial intelligence model at a memory address in one or more memory circuits. The method further comprises processing data for the artificial intelligence model across a plurality of artificial intelligence accelerators using the training data or the model parameters such that each of the plurality of artificial intelligence accelerators obtains the same training data or the same model parameters stored in the shared memory space at the memory address in the one or more memory circuits.

In some embodiments, the method further comprises communicating at least a portion of the training data or at least a portion of the model parameters over one or more communication links between accelerators of the plurality of artificial intelligence accelerators.

In some embodiments, the shared memory space is readable by the plurality of artificial intelligence accelerators using a direct memory access page number. In such embodiments, the plurality of artificial intelligence accelerators may not be configured to write to the shared memory.

In some embodiments, a memory agent device comprises the one or more memory circuits storing the storing training data or the model parameters. In such embodiments, the memory agent device may be a field-programmable gate array or an application-specific integrated circuit. In such embodiments, the memory agent device may store a mapping of virtual page numbers used by the plurality of artificial intelligence accelerators to physical page numbers of the one or more memory circuits of the memory agent device. In such embodiments, the memory agent device may comprise a shared buffer and may be configured to cache the training data or the model parameters in the shared buffer when a first accelerator of the plurality of artificial intelligence accelerators accesses the training data or the model parameters until each of the plurality of artificial intelligence accelerators has accessed the training data or the model parameters. In such embodiments, the memory agent device may increment a counter when each of the plurality of artificial intelligence accelerators accesses the training data or the model parameters and the memory agent device may reset the counter when it is equal to a number of accelerators in the plurality of artificial intelligence accelerators.

In one embodiment, the present disclosure provides a non-transitory computer readable storage medium having stored thereon program code executable by a computer system. The program code causes the computer system to establish a shared memory space storing training data or model parameters for an artificial intelligence model at a memory address in one or more memory circuits. The program code further causes the computer system to process data for the artificial intelligence model across a plurality of artificial intelligence accelerators using the training data or the model parameters, wherein each of the plurality of artificial intelligence accelerators obtains the same training data or the same model parameters stored in the shared memory space at the memory address in the one or more memory circuits.

In some embodiments, the shared memory space may be readable by the plurality of artificial intelligence accelerators using a direct memory access page number.

In some embodiments a memory agent device comprises the one or more memory circuits storing the storing training data or the model parameters. The memory agent device may store a mapping of virtual page numbers used by the plurality of artificial intelligence accelerators to physical page numbers of the one or more memory circuits of the memory agent device.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system comprising:

one or more processors of a host device that stores model parameters or training data for an artificial intelligence model;

a plurality of artificial intelligence accelerators that process data for the artificial intelligence model using the model parameters or the training data, each of the plurality of artificial intelligence accelerators comprising driver logic configured to issue memory requests to a corresponding one of multiple different dedicated host memory spaces within the host device;

a memory agent device separate from the host device that serves as a communication interface between the one or more processors of the host device and the plurality of artificial intelligence accelerators, the memory agent device configured to:

provide a shared memory space to the plurality of artificial intelligence accelerators, the shared memory space being mapped, via a many-to-one mapping, to the multiple different dedicated host memory spaces of the plurality of artificial intelligence accelerators, wherein the plurality of artificial intelligence accelerators are not configured to access the shared memory space;

cache, at an address block of the shared memory space, a subset of the training data or model parameters obtained from the host device;

translate requests from the plurality of artificial intelligence accelerators directed to the multiple different dedicated host memory spaces into accesses to the shared memory space; and return the subset of the training data or model parameters from the address block of the shared memory space when responding to the requests from the plurality of artificial intelligence accelerators that are directed to the multiple different dedicated host memory spaces within the host device such that the plurality of artificial intelligence accelerators operate as if they are accessing the multiple different dedicated host memory spaces while the subset of the training data or model parameters is shared via the shared memory space.

2. The computer system of claim 1 wherein the computer system further comprises one or more communication links between accelerators of the plurality of artificial intelligence accelerators, wherein the memory agent device is configured to:

initiate communication of at least a portion of the training data or at least a portion of the model parameters over the one or more communication links.

3. The computer system of claim 1 wherein the one or more processors are configured to write to the shared memory space and the plurality of artificial intelligence accelerators are not configured to write to the shared memory space.

4. The computer system of claim 1 wherein the memory agent device is a field-programmable gate array or an application-specific integrated circuit.

5. The computer system of claim 1 wherein the memory agent device stores a mapping of virtual page numbers used by the plurality of artificial intelligence accelerators to physical page numbers of one or more memory circuits of the memory agent device.

6. The computer system of claim 1 wherein the memory agent device comprises a shared buffer and is configured to cache the subset of the training data or model parameters in the shared buffer when a first accelerator of the plurality of artificial intelligence accelerators accesses the training data or the model parameters.

7. The computer system of claim 1 wherein the memory agent device:

receives a plurality of addresses from the plurality of artificial intelligence accelerators;

stores the plurality of addresses as virtual page numbers; and maps the virtual page numbers to a physical page of one or more memory circuits.

8. The computer system of claim 7, wherein the memory agent device further classifies addresses as one of shared or unique, and wherein when an address received from one of the plurality of artificial intelligence accelerators does not match an address stored as the virtual page numbers, the memory agent device accesses a physical page of one or more memory circuits of the memory agent device that is not shared.

9. The computer system of claim 8, wherein the one or more processors are part of a host system, and wherein, in response to receiving a first address stored as a first virtual page number in the memory agent device from one of the plurality of artificial intelligence accelerators, the memory agent device retrieves data from the host system and stores the data in the one or more memory circuits.

10. A method of processing an artificial intelligence model comprising:

providing a memory agent device that is separate from a host device and that serves as a communication interface between the host device and a plurality of artificial intelligence accelerators, each of the plurality of artificial intelligence accelerators comprising driver logic configured to issue memory requests exclusively to a corresponding one of multiple different dedicated host memory spaces within the host device;

establishing, by the memory agent device a shared memory space that is mapped, via a many-to-one mapping, to the multiple different dedicated host memory spaces within the host device, wherein the plurality of artificial intelligence accelerators are not configured to access the shared memory space;

caching, by the memory agent device and at an address block of the shared memory space, a subset of training data or model parameters obtained from the host device;

translating requests from the plurality of artificial intelligence accelerators directed to the multiple different dedicated host memory spaces into accesses to the shared memory space;

returning the subset of training data or model parameters from the address block of the shared memory space when responding to requests from the plurality of artificial intelligence accelerators that are directed to the multiple different dedicated host memory spaces within the host device such that the plurality of artificial intelligence accelerators operate as if they are accessing the multiple different dedicated host memory spaces while the subset of training data or model parameters is shared via the shared memory space.

11. The method of claim 10 further comprising communicating at least a portion of the subset of training data or at least a portion of the model parameters over one or more communication links between accelerators of the plurality of artificial intelligence accelerators.

12. The method of claim 10 wherein the plurality of artificial intelligence accelerators are not configured to write to the shared memory space.

13. The method of claim 10 wherein the memory agent device is a field-programmable gate array or an application-specific integrated circuit.

14. The method of claim 13 wherein the memory agent device comprises a shared buffer and the subset of the training data or model parameters is cached in the shared buffer when a first accelerator of the plurality of artificial intelligence accelerators accesses the subset of training data or model parameters.

15. The method of claim 14 wherein the memory agent device increments a counter when each of the plurality of artificial intelligence accelerators accesses the subset of training data or model parameters and resets the counter when it is equal to a number of accelerators in the plurality of artificial intelligence accelerators.

16. A non-transitory computer readable storage medium having stored thereon program code executable by a computer system, the program code causing the computer system to:

configuring a memory agent device as a communication interface between a host device and a plurality of artificial intelligence accelerators, wherein the memory agent device is separate from the host device and each of the plurality of artificial intelligence accelerators includes driver logic configured to issue memory requests exclusively to a corresponding one of multiple different dedicated host memory spaces within the host device;

establish, by the memory agent device a shared memory space that is mapped, via a many-to-one mapping, to the multiple different dedicated host memory spaces within the host device, wherein the plurality of artificial intelligence accelerators are not configured to access a shared memory space;

cache, at an address block within the shared memory space of the memory agent device, a subset of training data or model parameters obtained from the host device and for an artificial intelligence model;

translate requests from the plurality of artificial intelligence accelerators directed to the multiple different dedicated host memory spaces into accesses to the shared memory space;

return the subset of training data or model parameters from the address block of the shared memory space when responding to the requests from the plurality of artificial intelligence accelerators that are directed to the multiple different dedicated host memory spaces within the host device such that the plurality of artificial intelligence accelerators operate as if they are accessing the multiple different dedicated host memory spaces while the subset of training data or model parameters is shared via the shared memory space.

* * * * *